(12) United States Patent
Yoo et al.

(10) Patent No.: US 7,717,688 B2
(45) Date of Patent: May 18, 2010

(54) OIL PUMP FOR A COMPRESSOR

(75) Inventors: Byoung Kil Yoo, Seoul (KR); Byeong Chul Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 46 days.

(21) Appl. No.: 11/604,902

(22) Filed: Nov. 28, 2006

(65) Prior Publication Data

US 2007/0134118 A1    Jun. 14, 2007

(51) Int. Cl.
  *F04C 15/00* (2006.01)
  *F04C 27/02* (2006.01)

(52) U.S. Cl. .......................... 418/88; 418/9; 418/55.6; 418/94; 418/97; 184/6.16; 184/6.18

(58) Field of Classification Search ............ 418/5, 418/8, 9, 166, 171, 55.1–55.6, 88, 94; 184/6.16–6.18
See application file for complete search history.

(56) References Cited

U.S. PATENT DOCUMENTS

| | | | | |
|---|---|---|---|---|
| 3,796,522 A * | 3/1974 | Oshima et al. | ................ | 418/15 |
| 5,017,108 A * | 5/1991 | Murayama et al. | ......... | 418/55.6 |
| 5,775,120 A * | 7/1998 | Inazuka et al. | ............. | 62/259.1 |
| 5,775,123 A * | 7/1998 | Wakayama et al. | ........... | 62/407 |
| 5,810,573 A * | 9/1998 | Mitsunaga et al. | ......... | 418/55.6 |
| 5,947,373 A * | 9/1999 | Saito et al. | .................. | 237/2 B |
| 6,182,460 B1 * | 2/2001 | Hernandez et al. | ............ | 62/262 |
| 6,374,492 B1 * | 4/2002 | Myung et al. | ............ | 29/890.03 |
| 6,412,298 B2 * | 7/2002 | Kang et al. | .................... | 62/262 |
| 6,588,228 B2 * | 7/2003 | Choi | ............................ | 62/426 |
| 6,772,601 B1 * | 8/2004 | Davis et al. | .................... | 62/187 |
| 6,868,681 B2 * | 3/2005 | Woo et al. | ...................... | 62/175 |
| 6,951,628 B2 * | 10/2005 | Eidam et al. | ................ | 264/401 |
| 6,955,064 B2 * | 10/2005 | Lee et al. | ....................... | 62/453 |
| 6,962,058 B2 * | 11/2005 | Kim et al. | ..................... | 62/175 |
| 7,032,404 B2 * | 4/2006 | Kim et al. | ..................... | 62/262 |
| 7,036,331 B2 * | 5/2006 | Kim | ............................. | 62/262 |
| 7,055,338 B2 * | 6/2006 | Ergarac et al. | ............. | 62/228.1 |
| 7,082,776 B2 * | 8/2006 | Shin | ............................. | 62/186 |
| 7,114,345 B2 * | 10/2006 | Kim et al. | ..................... | 62/296 |
| 7,121,106 B2 * | 10/2006 | Jung et al. | ................. | 62/324.6 |

FOREIGN PATENT DOCUMENTS

| | | | | |
|---|---|---|---|---|
| JP | 05044676 A | * | 2/1993 | |
| JP | 08219062 A | * | 8/1996 | |
| JP | 09088852 A | * | 3/1997 | |
| JP | 09170579 A | * | 6/1997 | |

* cited by examiner

*Primary Examiner*—Theresa Trieu
(74) *Attorney, Agent, or Firm*—KED & Associates, LLP (57) ABSTRACT

An oil pump for a compressor is provided. The oil pump includes a pump body, a driving shaft coupled to the pump body, with a supply passage extending therethrough, and a plurality of pumping members which rotate with the driving shaft. Fluids such as oil are inhaled into the pump through various intakes, and the inhaled oil is directed towards the driving shaft, where the oil is supplied to the friction parts of the compressor for lubrication. The plurality of intakes into the pump provide for a continuous supply of oil to the friction parts.

12 Claims, 8 Drawing Sheets

OIL PUMP FOR A COMPRESSOR

BACKGROUND

1. Field

This relates to a compressor, and more particularly, to an oil pump for a compressor.

2. Background

In general, a compressor converts mechanical energy into compressive force. Compressors may be categorized into a reciprocating type, a scroll type, a centrifugal type and a vane type. Scroll compressors are commonly used in air conditioning and refrigeration applications. Scroll compressors may be further divided into a low-pressure type scroll compressor and a high-pressure type scroll compressor based on whether the inner part of the casing is filled with a suction gas or a discharge gas.

BRIEF DESCRIPTION OF THE DRAWINGS

The embodiments will be described in detail with reference to the following drawings, in which like reference numerals refer to like elements, wherein.

DETAILED DESCRIPTION

Figure 1:
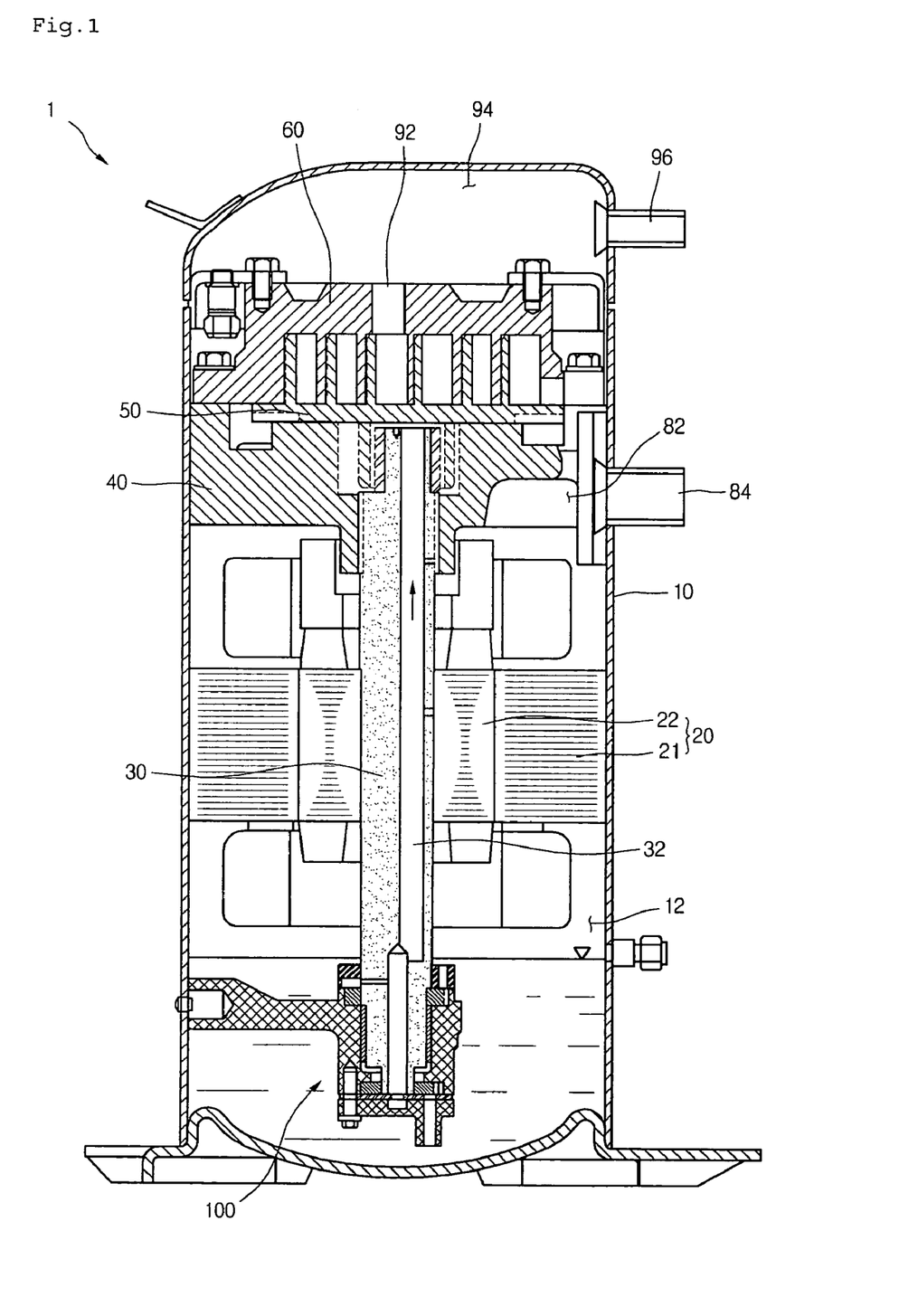
FIG. 1 is a cross-sectional view of an exemplary scroll compressor with an oil pump as embodied and broadly described herein.

FIG. 1 illustrates an exemplary scroll compressor. Although a scroll compressor is shown, for ease of discussion, it is well understood that an oil pump as embodied and broadly described herein may be applied to other types of compressors, or in other applications which require fluid pumping. As shown in FIG. 1, the exemplary scroll compressor 1 includes a casing 10 which forms an external housing, a drive portion arranged within the casing 10 which generates a rotary force, a suction portion which introduces fluid into the compressor, a scroll compression portion which compresses the fluid introduced by the suction portion, a discharge portion which discharges high-pressured fluid compressed by the scroll compression portion, and an oil pump 100 which supplies oil to the scroll compression portion.

The drive portion may include a drive motor 20 with a stator 21 and a rotor 22 positioned at an inner side of the stator 21, and a driving shaft 30 which rotates at a central portion of the drive motor 20. Vertical supply passages 32 formed along the length of the driving shaft 30 allow oil pumped by the oil pump 100 to flow to an upper portion of the compressor 1, and in particular, to the friction parts of the compressor 1, such as, for example, the components of the scroll compression portion.

The suction portion may include a suction pipe 84 provided on a side of the casing 10, and a suction chamber 82 in communication with the suction pipe 84 and in which refrigerant drawn in through the suction pipe 84 is accumulated.

The scroll compression portion may include an upper frame 40 which supports an upper end portion of the driving shaft 30, an orbiting scroll 50 positioned on an upper side of the upper frame so as to compress refrigerant drawn in through the suction pipe 84, and a fixed scroll 60 fixed on the upper side of the upper frame 40 and coupled to the orbiting scroll 50.

The discharge portion may include a discharge port 92 which discharges the compressed refrigerant from a central portion of the scrolls 50, 60, a discharge chamber 94 in communication with the discharge port 92, and a discharge pipe 96 in communication with the discharge chamber 94 and extending through a side of the casing 10. The discharge chamber 94 shown in FIG. 1 is positioned near or at an upper portion of the casing 10. However, other positions may also be appropriate.

Likewise, the oil pump 100 shown in FIG. 1 is positioned near or at the lower portion of the casing 10. However, other positions may also be appropriate, based on the positioning of related components. The oil pump 100 pumps oil stored in a storage area 12 based on the rotation of the driving shaft 30. In certain embodiments, the oil pump 100 is capable of pumping oil from a plurality of different intakes positioned at different areas, including, for example, the upper side and the lower side of the oil pump 100.

Operation of the exemplary scroll compressor 1 having an oil pump as embodied and broadly described herein will now be discussed.

When the compressor 1 is operated, refrigerant is drawn in through the suction pipe 84. If the compressor 1 is operated in a low temperature heating condition, a low-temperature liquid refrigerant is drawn in through the suction pipe 84. A portion of the refrigerant flows into the suction chamber 82, and then into the scroll compression portion for compression. The remaining portion of the refrigerant flows into the storage area 12 and accumulates therein.

The portion of the refrigerant provided to the scroll compression unit is compressed to a high pressure by the rotating movement of the orbiting scroll 50, and the compressed refrigerant gathers at a central part of the scrolls 50, 60. This accumulated high-pressured refrigerant flows to the discharge chamber 94 through the discharge port 92. Refrigerant accumulated in the discharge chamber 94 is then discharged outside of the compressor 1 through the discharge pipe 96. During this compression process, oil stored in the storage area 12 is supplied to friction parts of the compressor 1, such as, for example, the components of the scroll compression portion of the compressor 1, by a pumping operation due to the rotation of the driving shaft 30.

When the compressor 1 is operated in a low temperature heating condition, the low-temperature refrigerant and oil stored in the oil storage 12 are not mixed, but rather, separated from each other. The refrigerant, which is relatively heavier than the oil, accumulates in a lower-portion of the storage area 12, while the oil, which is relatively lighter than the refrigerant, accumulates in an upper portion of the storage area 12. In this situation, the refrigerant is drawn into the pump 100 at the lower side of the oil pump 100, and the oil is drawn into the pump 100 at the upper side of the oil pump 100.

Figure 2:
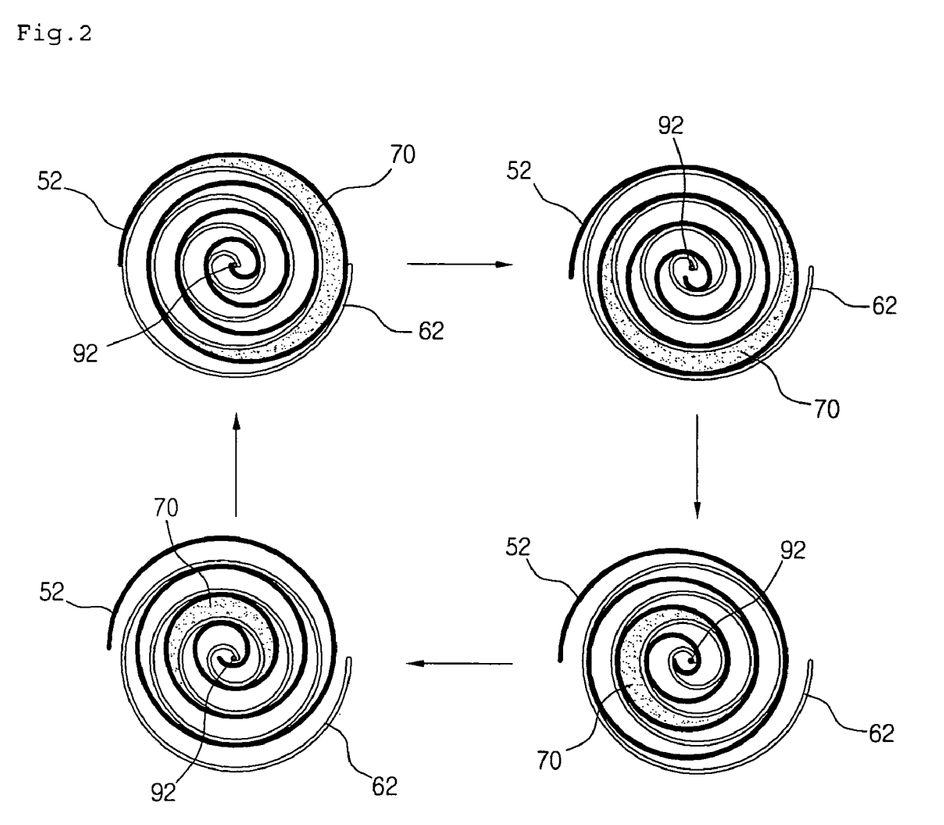
FIG. 2 illustrates a compression operation in the exemplary scroll compressor shown in FIG. 1.

FIG. 2 illustrates a process by which refrigerant is compressed in the exemplary scroll compressor. The scroll compression unit may include a fixed scroll wrap 62 formed in a spiral shape on the lower side of the fixed scroll 60, and an orbiting scroll wrap 52 formed in a spiral shape on the upper side of the orbiting scroll 50 and 180 degrees cross-inserted into the fixed scroll wrap 62, with the discharge port 92 formed on the inside central part of the fixed scroll wrap 62.

First, the eccentric orbiting scroll 50, which is centered on the driving shaft 30, revolves. Then, as the orbiting scroll 50 revolves against the fixed scroll 60 due to the rotation of the driving shaft 30, a pocket 70 is formed. The pocket 70 compresses refrigerant due to the surface contact between the wraps 52, 62.

The size of the pocket 70 decreases as it approaches the central part of the scroll wrap, and the pressure increases as the size of the pocket 70 decreases. This causes fluid in the pocket 70 to be compressed as it moves toward to the central part. The compressed fluid is discharged from this central part of the scroll wraps to the discharge chamber 94 through the discharge port 92.

Figure 3:
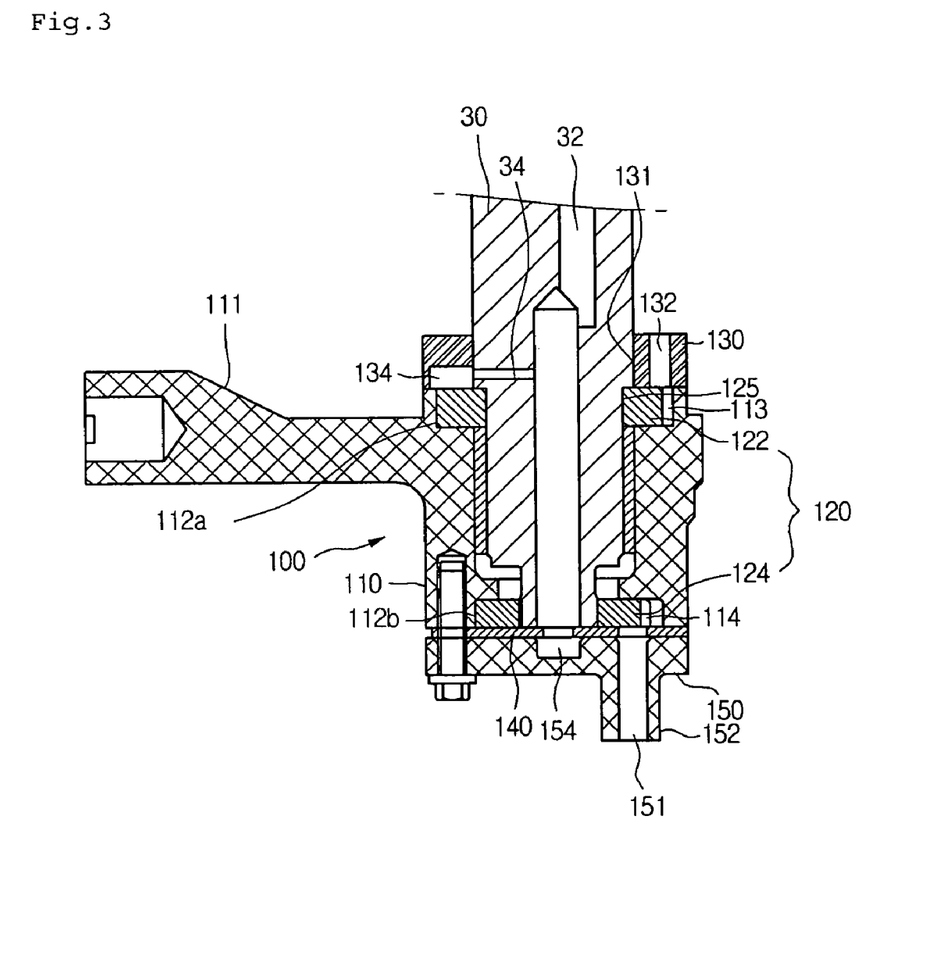
FIG. 3 is a cross-sectional view of an oil pump as embodied and broadly described herein.

Referring to FIG. 3, an oil pump 100 in accordance with embodiments as broadly described herein may include a pump body 110 into which the driving shaft 30 may be inserted, a plurality of pumping members 120 which rotate with the rotation of the driving shaft 30 inserted in the pump body 110, an upper cover 130 positioned at an upper side of the pump body 110, a guide plate 140 positioned at a lower side of the pump body 110 and so as to guide the inflow and discharge of fluids, and a lower cover 150 positioned at a lower side of the guide plate 140.

The pump body 110 may be provided in a lower portion of the casing 10. In certain embodiments, the pump body 110 may include one or more fixing units 111 which extend outwards towards the casing 10. The fixing units 111 may be coupled to the casing 10 so as to fix the pump body 110 in place within the casing 10.

Pumping member insertion grooves 112a, 112b may be formed on the upper/lower sides, respectively, of the pumping body 110 so as to receive the pumping members 120 therein. Oil pumping parts 113, 114 may be defined between an inner circumferential surface of the pumping member insertion grooves 112a, 112b and the pumping member 120. When the oil stored in the storage area 12 flows into oil pumping parts 113, 114, the oil undergoes a predetermined pumping process based on rotation of the pumping member 120, and flows in to the inner part of the driving shaft 30, where it is directed towards the upper portion of the compressor 1.

The pumping member 120 may include an upper pumping member 122 which pumps oil at the upper side of the pump body 110, and a lower pumping member 124 which pumps oil at the lower side of the pump body 110. A driving shaft inserting hole 125 in which the driving shaft 30 is inserted may be formed at a central portion of the pumping members 122, 124 such that the pumping member 120 rotates with the rotation of the driving shaft 30.

Figure 4:
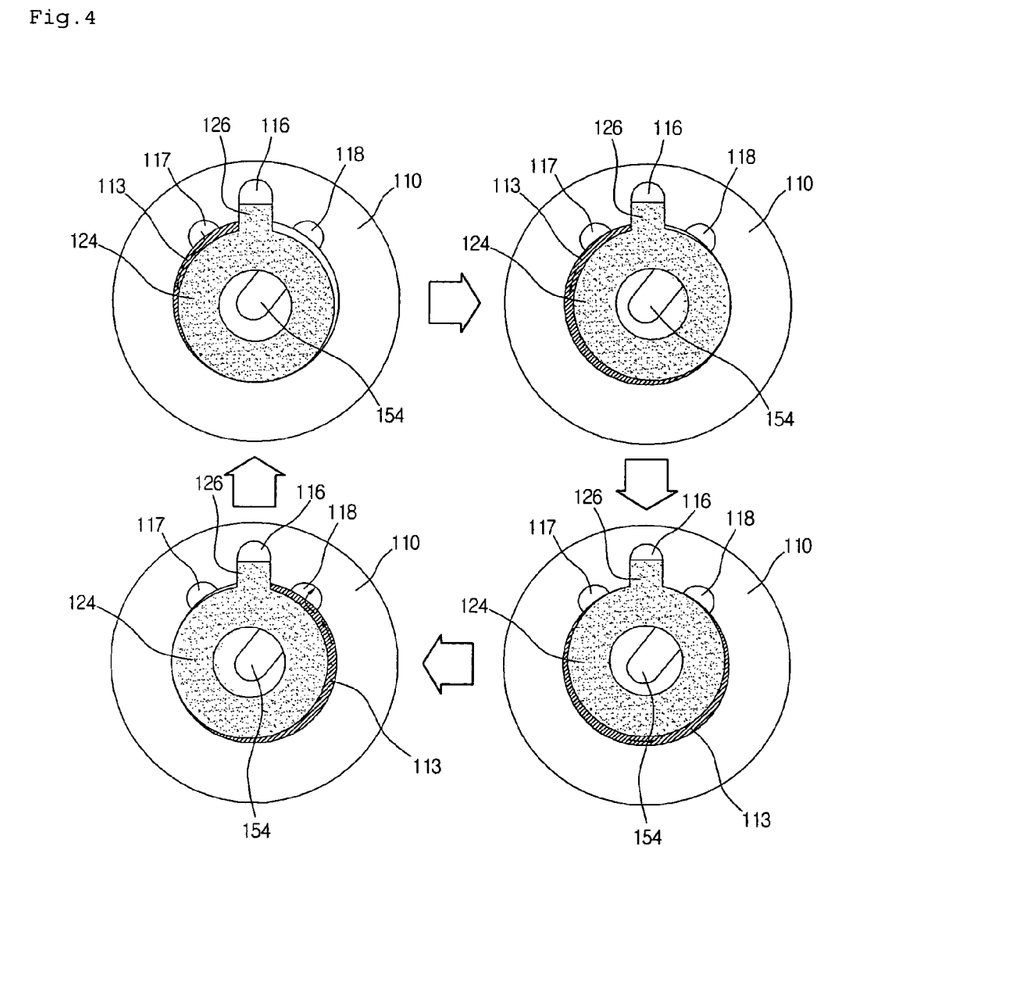
FIG. 4 illustrates a process in which oil is pumped by pumping members of the oil pump shown in FIG. 4.

Each of the pumping members 122, 124 may be fixed to the pump body 110 (see FIG. 4). Therefore, the pumping member 120 does not actually rotate, but rather revolves with respect to the driving shaft 30 as the driving shaft 30 is rotated.

The guide plate 140 may be substantially circular, and may prevent direct friction between the lower pumping member 124 and the lower cover 150, as well as guiding the inflow and the discharge of fluids.

The upper cover 130 may be coupled to the pump body 110. The upper cover 130 may include a shaft penetrating hole 131 through which the driving shaft 30 passes formed at the central portion thereof, and an intake 132 which allows oil to flow into the oil pump 100. A discharge groove 134 which discharges the oil pumped by the pumping member 122 to the driving shaft 30 may be formed as a recess on the lower surface of the upper cover 130. Oil which flows to the pumping part 113 through the intake 132 is directed to the discharge groove 134 by the rotation of the upper pumping member 122.

The upper cover 130 may be coupled to the pump body 110 in a number of different ways, including, for example by fasteners, welds and the like. Other attachment devices may also be appropriate. The lower cover 150 may be coupled to the pump body 110 at the lower side of the guide plate 140. A suction part 152 which draws refrigerant and oil stored in the storage area 12 into the pump 100 may extend downward from the lower side of the lower cover 150. Fluids flow through the suction part 152 into the pumping part 114 through a suction path 151.

A discharge groove 154 which allows the refrigerant and oil moved by the rotation of the lower pumping member 124 to be discharged to the driving shaft 30 may be formed as a recess on the upper side of the lower cover 150. The discharge groove 154 allows fluids in the inner part of the oil pumping part 114 to be moved to the discharge groove 154 (see to FIG. 4). In this manner, the upper and lower covers 130, 150 guide fluids discharged by the pumping member 120 towards the driving shaft 30.

A supply passage 32 formed in the driving shaft 30 serves as a passage for the oil to reach the scroll compression portion. An oil inflow hole 34 connected with the supply passage 32 may be formed on a side of the driving shaft 30. This allows oil in the discharge groove 134 to flow into the oil inflow hole 34 as the driving shaft 30 is rotated. Therefore, oil pumped by the upper pumping member 122 flows in through the oil inflow hole 34, and oil pumped by the lower pumping member 124 flows in through the lower end of the supply passage 32, allowing oil to be supplied to the scroll compression portion via the passage 32.

Figure 5:
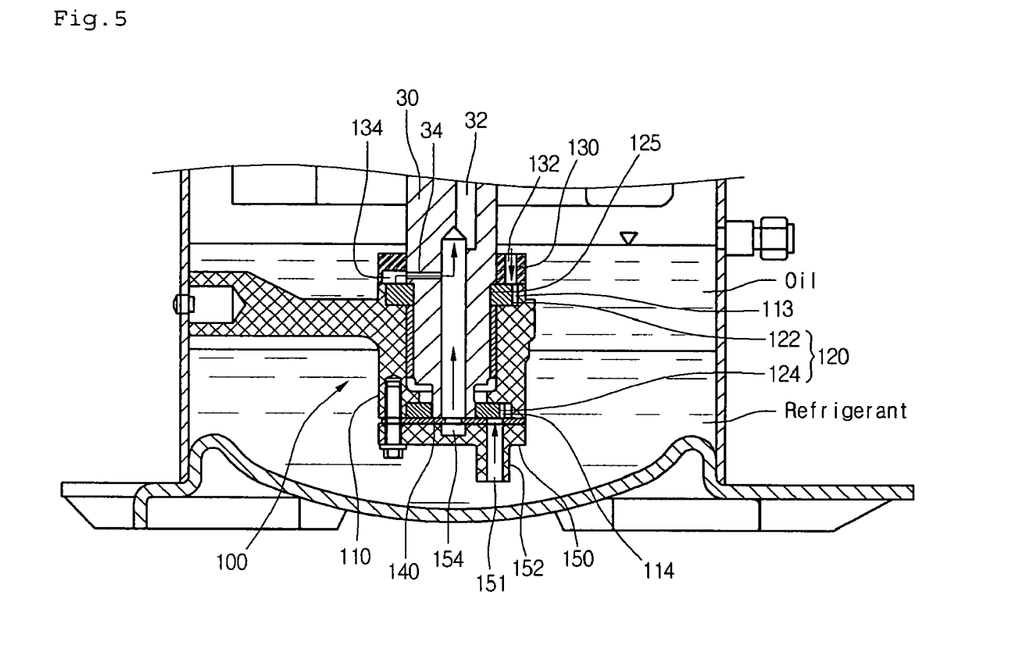
FIG. 5 illustrates an operation of the oil pump shown in FIG. 4 in a condition in which refrigerant and oil are phase-separated from each other.

An oil supplying process will now be described with respect to FIGS. 4 and 5, where FIG. 4 illustrates an oil pumping process carried out by the pumping members 122 and 124, and specifically, operation of the pump body 110 and the lower pumping member 124, and FIG. 5 illustrates operation of the oil pump 100 in a condition in which the refrigerant and oil are phase-separated from each other.

Referring to FIG. 4, a fixing protrusion 126 protrudes from a side of the lower pumping member 124, and a fixing groove 116 in which the fixing protrusion 126 is inserted is formed on the pump body 110, extending from the pumping member insertion groove 112. An intake 117 through which fluids may be drawn in and an outlet 118 through which fluids moved by the rotation of the lower pumping member 124 may be discharged are formed on the pump body 110. The fixing groove 116, intake 117, and outlet 118 may be formed on both the upper and lower sides of the pump body 110 so as to accommodate both the upper and lower pumping members 122, 124. However, for ease of illustration, only those corresponding to the lower pumping member 124 are shown in FIG. 4.

First, oil and refrigerant are drawn in through the intake 132 of the upper cover 130 and the intake 152 of the lower cover 150 due to a pressure disparity generated when each of the pumping members 122, 124 is rotated by the rotation of the driving shaft 30. Then, the refrigerant and oil drawn in through the intakes 132, 152 flow into the oil pumping parts 113, 114, where they flow along an inner circumferential surface of the pumping member insertion grooves 112a, 112b by the rotation of the pumping members 122, 124 towards the outlet 118.

The refrigerant and oil are discharged through the outlet 118 to the discharge grooves 134, 154 of the upper and lower cover 130, 150. The refrigerant and oil discharged to the discharge groove 134 of the upper cover 130 flow into the oil inflow hole 34 whenever the oil inflow hole 34 and the discharge groove 134 are aligned, and then into the supply passage 32. The refrigerant and oil discharged to the discharge groove 154 of the lower cover 150 flow into the supply passage 32.

If the refrigerant and oil are phase-separated from each other as the compressor 1 operates in a low temperature heating condition, the intake 132 draws oil into the pump 100, and the intake 152 draws refrigerant into the pump 100. The oil and refrigerant then separately follow the flow paths as described above based on their point of entry.

By performing these pumping operations in a plurality of areas, oil may be supplied smoothly and continuously to the friction parts of the compressor 1, such as, for example, the components of the scroll compression portion.

Further, oil may be drawn in through the intake 132 of the upper cover 130, and pumped by the upper pumping member 122, even though the refrigerant and oil stored in the storage area 12 are phase-separated from each other when the compressor 1 operates in a low temperature heating condition.

Additionally, abrasions may be prevented, as the friction parts are lubricated well due to the continuous supply of oil, thereby enhancing operability, reliability and capacity of the compressor.

Figure 6:
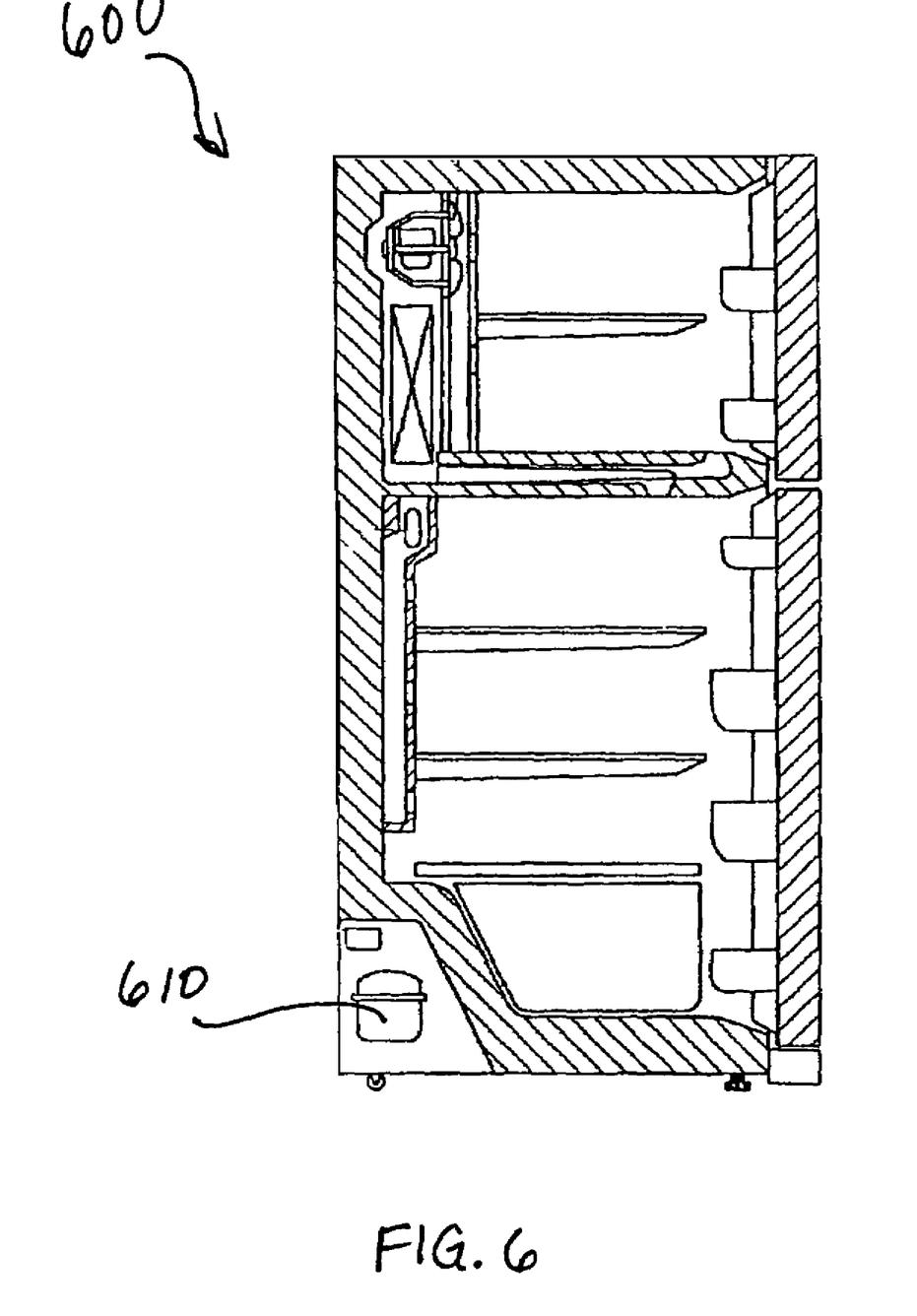
FIGS. 6-8 illustrate exemplary installations of a compressor having an oil pump as embodied and broadly described herein.

The oil pump for a compressor as embodied and broadly described herein has numerous applications in which compression of fluids is required, and in different types of compressors. Such applications may include, for example, air conditioning and refrigeration applications. One such exemplary application is shown in FIG. 6 in which a compressor 610 having an oil pump as embodied and broadly described herein is installed in a refrigerator/freezer 600. Installation and functionality of a compressor in a refrigerator is discussed in detail in U.S. Pat. Nos. 7,082,776, 6,955,064, 7,114,345, 7,055,338 and 6,772,601, the entirety of which are incorporated herein by reference.

Figure 7:
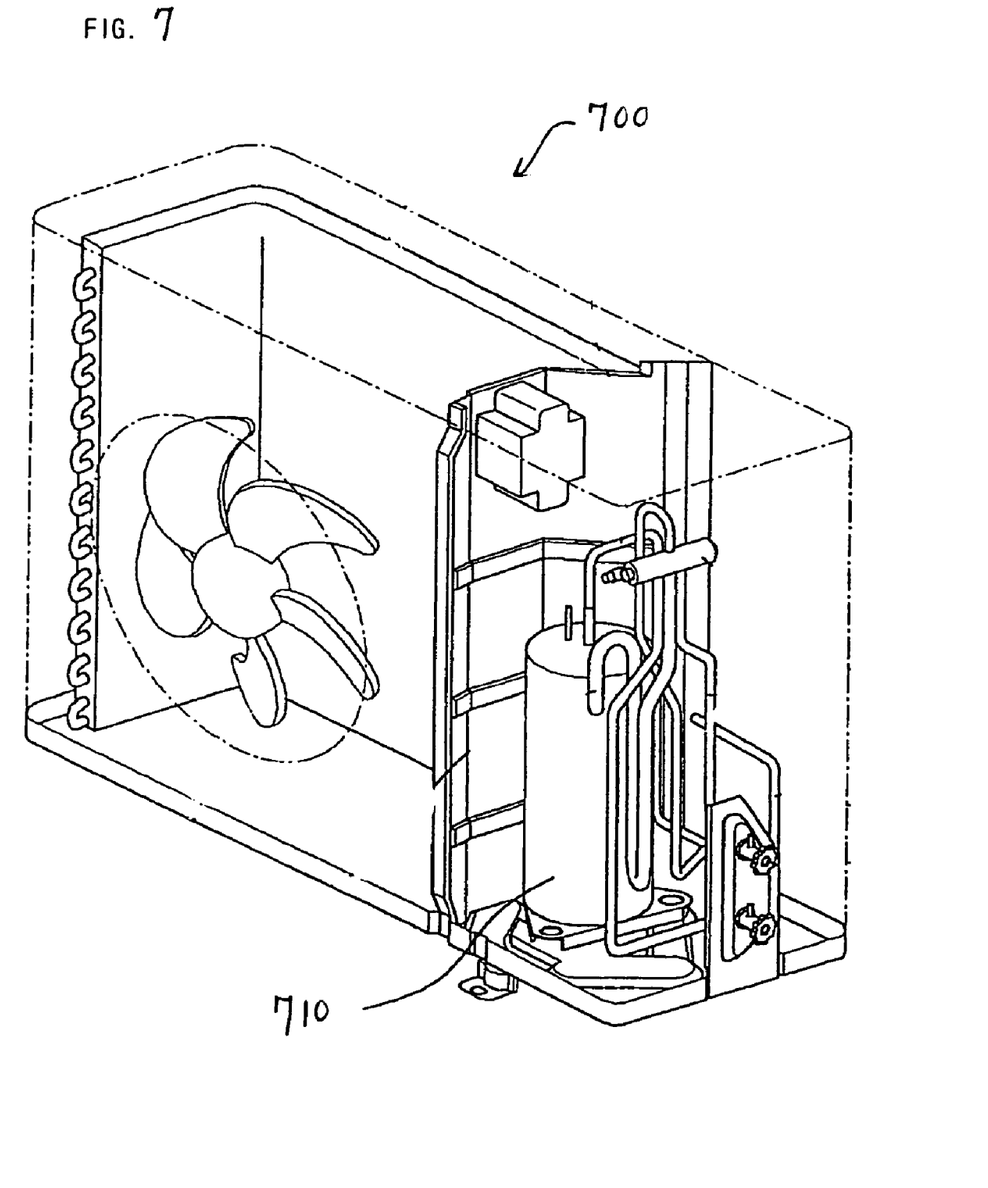

Another such exemplary application is shown in FIG. 7, in which a compressor 710 having an oil pump as embodied and broadly described herein is installed in an outdoor unit of an air conditioner 700. Installation and functionality of a compressor in this type of air conditioner is discussed in detail in U.S. Pat. Nos. 7,121,106, 6,868,681, 5,775,120, 6,374,492, 6,962,058, 6,951,628 and 5,947,373, the entirety of which are incorporated herein by reference.

Figure 8:
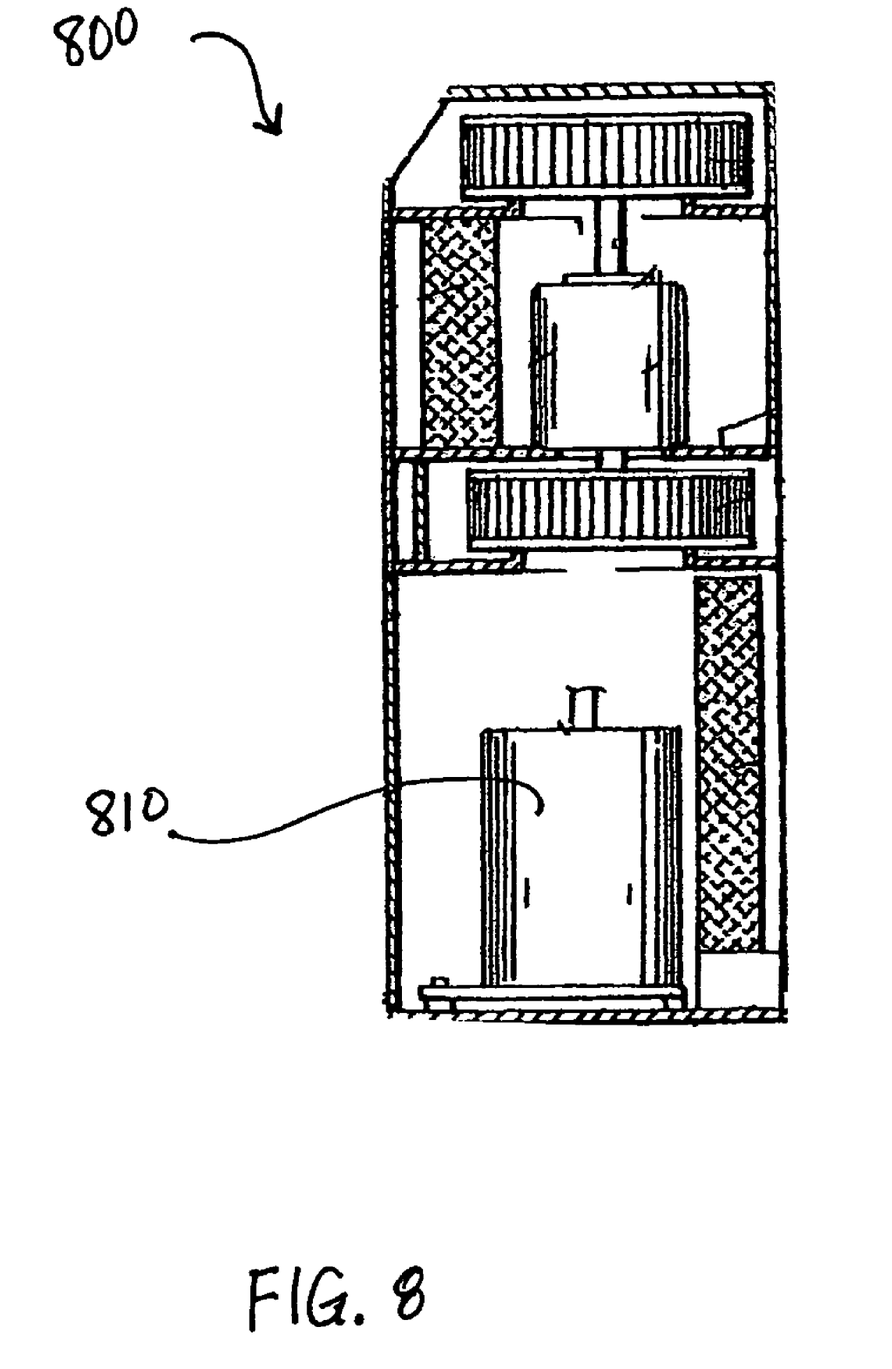

Another such exemplary application is shown in FIG. 8, in which a compressor 810 having an oil pump as embodied and broadly described herein is installed in a single, integrated air conditioning unit 800. Installation and functionality of a compressor in this type of air conditioner is discussed in detail in U.S. Pat. Nos. 7,032,404, 6,412,298, 7,036,331, 6,588,228, 6,182,460 and 5,775,123, the entirety of which are incorporated herein by reference.

Likewise, the oil pump as embodied and broadly described herein is not limited to installation in compressors. Rather, the oil pump as embodied and broadly described herein may be applied in any situation in which this type of fluid pumping is required and/or advantageous.

An object is to provide an oil pump for a scroll compressor capable of inhaling oil even though refrigerant and oil stored in a fluid storage area of the compressor are separated in a low temperature heating condition.

It is another object to provide an oil pump for a scroll compressor which prevents abrasion and damage to friction parts of the compressor by smoothly and continuously supplying oil to the friction parts in a low temperature heating condition.

An oil pump for scroll compressor in accordance with embodiments as broadly described herein includes a pump body, a driving shaft mounted on the pump body and having a supply passage in the inner part, a plurality of pumping numbers rotating with the driving shaft as mounted on the pump body and discharging the inhaled oil to the driving shaft, and a plurality of cover members covering each of the pumping member and having oil intakes inhaling oil.

An oil pump for a scroll compressor in accordance with another embodiment as broadly described herein includes a driving shaft having a supply passage in the inner part, a pump body in which the driving shaft is inserted, an upper suction unit inhaling the oil in the upper side of the pump body, and a lower suction unit inhaling the oil in the lower side of the pump body.

An oil pump for a scroll compressor in accordance with another embodiment as broadly described herein includes a pump body, an upper pumping member progressing the pumping operation of oil as united on the upper side of the pump body, an upper cover covering the upper pumping member and having an oil intake, a lower pumping member progressing the pumping operation of oil as united on the lower side of the pump body, a lower cover covering the lower pumping member and having an oil suction unit, and a driving shaft coupled to the upper and a lower pumping members.

A compressor having an oil pump as embodied and broadly described herein provides a continuous supply of oil to friction parts of compressor, and a large amount of oil may be supplied as each of the refrigerant and oil may be pumped by the upper and lower pumping members if both refrigerant and oil are contained in the storage area.

A compressor having an oil pump as embodied and broadly described herein provides a continuous supply of oil, even though the refrigerant and oil may phase-separate from each other, as the lower pumping member pumps the refrigerant and the upper pumping member pumps the oil, if the compressor is operated in a low temperature heating condition.

A compressor with an oil pump as embodied and broadly described herein improves operability, capacity and reliability of the compressor, as the friction parts of the compressor are lubricated well due to the continuous supply of oil.

Any reference in this specification to "one embodiment," "exemplary embodiment," "certain embodiment," "alternative embodiment" and the like means that a particular feature, structure, or characteristic described in connection with the embodiments is included in at least one embodiment as broadly described herein. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An oil pump for a compressor, comprising:
   a pump body;
   a drive shaft rotatably coupled to the pump body, wherein the drive shaft has a passage formed in an inner portion thereof and an inflow hole formed on the drive shaft;

a plurality of pumping members provided with the pump body and configured to rotate with the drive shaft, the plurality of pumping members comprising:
  a first pumping member configured to receive fluid from an upper end of the pump body and to discharge the fluid to the drive shaft; and
  a second pumping member configured to receive fluid from a lower end of the pump body and to discharge the fluid to the drive shaft, wherein the fluid pumped by the first pumping member is provided to an inner part of the passage formed in the drive shaft, and the fluid pumped by the second pumping member is provided to the inner part of the passage formed in the drive shaft; and
an upper cover configured to cover the first pumping member and a lower cover configured to cover the second pumping member, wherein the upper cover has at least one passage formed therein configured to receive fluid from a respective inner part of the compressor and to direct the received fluid to the first pumping member, and the upper cover further has a discharge groove configured to discharge fluid from the first pumping member to the passage formed in the drive shaft, wherein the fluid discharged to the discharge groove of the upper cover flows into the inflow hole of the drive shaft when the inflow hole of the drive shaft is aligned with the discharge groove of the upper cover, and
the lower cover has at least one passage formed therein configured to receive fluid from a respective inner part of the compressor and to direct the received fluid to the second pumping member, and the lower cover further has a discharge groove configured to discharge fluid from the second pumping member to the passage formed in the drive shaft.

2. The oil pump of claim 1, wherein the inflow hole is formed within the drive shaft extending substantially perpendicular to a longitudinal axis of the drive shaft, between the passage formed in the drive shaft and the discharge groove formed in the upper cover.

3. The oil pump of claim 1, wherein the upper cover is configured to draw oil into the pump and the lower cover is configured to draw refrigerant into the pump if refrigerant and oil stored in the inner part of the compressor are phase-separated from each other.

4. The oil pump of claim 1, wherein each of the first and second pumping members has a fixing protrusion, and wherein the pump body has a plurality of fixing grooves into which the fixing protrusions are respectively inserted so as to couple the first and second pumping members to the pump body.

5. A scroll compressor comprising the oil pump of claim 1.

6. An oil pump for a compressor, comprising:
a drive shaft with a passage formed therein and including an inflow hole formed on the drive shaft;
a pump body configured to receive the drive shaft;
a first suction unit having a first passage configured to draw fluid from a first side of the pump body through an upper cover and into an upper pumping member provided on an upper side of the pump body, wherein the upper pumping member is configured to discharge the fluid to a discharge groove formed in the upper cover and into the inflow hole formed in the drive shaft, wherein the inflow hole is oriented substantially perpendicular to the passage formed in the drive shaft so as to provide for fluid communication between the discharge groove formed in the upper cover and the passage formed in the drive shaft, wherein the fluid discharged to the discharge groove of the upper cover flows into the inflow hole of the drive shaft when the inflow hole of the drive shaft is aligned with the discharge groove of the upper cover; and
a second suction unit having a second passage configured to draw fluid into from a second side of the pump body through a lower cover and into a lower pumping member provided on a lower side of the pump body, and wherein the lower pumping member is configured to receive fluid drawn in through an intake formed in the lower cover, and to discharge the fluid to a discharge groove formed in the lower cover and towards the passage formed in the drive shaft.

7. The oil pump of claim 6, wherein the upper cover comprises a shaft penetrating hole configured to receive the drive shaft therethrough, an intake configured to draw fluid into the pump, and the discharge groove configured to discharge fluid pumped by the upper pumping member.

8. An oil pump for a compressor, comprising:
a pump body;
a first pumping member provided on a first side of the pump body and configured to pump fluid through at least one passage formed therein;
a first cover configured to cover the first pumping member, wherein the first cover includes a first intake formed therein and a first discharge groove formed therein, wherein fluid pumped by the first pumping member is discharged via the first discharge groove towards a drive shaft;
a second pumping member provided on a second side of the pump body and configured to pump fluid through at least one passage formed therein;
a second cover configured to cover the second pumping member, wherein the second cover includes a second intake formed therein and a second discharge groove formed therein, wherein fluid pumped by the second pumping member is discharged via the second discharge groove towards the drive shaft; and
the drive shaft coupled to the first and second pumping members, wherein the drive shaft comprises a passage into which fluid pumped by the second pumping member flows, and an inflow hole connected to the passage, wherein fluid pumped by the first pumping member flows via the first discharge groove through the inflow hole and into the passage formed in the drive shaft when the inflow hole of the drive shaft is aligned with the first discharge groove of the first cover, and wherein the fluid pumped by the first pumping member is blocked from reaching the passage formed in the drive shaft when the inflow hole of the drive shaft is not aligned with the first discharge groove of the first cover.

9. The oil pump of claim 8, wherein the first cover comprises a shaft penetrating hole configured to receive the drive shaft therethrough.

10. The oil pump of claim 8, wherein the first and second pumping parts are defined by spaces formed between the first and second pumping members and the pump body, respectively.

11. The oil pump of claim 8, wherein the first pumping member is provided at an upper side of the pump body so as to pump fluid from an upper side of the pump body, and the second pumping member is provided at a lower side of the pump body so as to pump fluid from a lower side of the pump body, wherein the fluid is oil, refrigerant, or a mixture thereof.

12. A scroll compressor comprising the oil pump of claim 8.

* * * * *

UNITED STATES PATENT AND TRADEMARK OFFICE
CERTIFICATE OF CORRECTION

PATENT NO. : 7,717,688 B2  Page 1 of 1
APPLICATION NO. : 11/604902
DATED : May 18, 2010
INVENTOR(S) : Byoung Kil Yoo and Byeong Chul Lee It is certified that error appears in the above-identified patent and that said Letters Patent is hereby corrected as shown below:

On the Title Page

Item (30)   Foreign Application Priority Data should read

Nov. 30, 2005     (KR)     10-2005-0115285

Signed and Sealed this

Twenty-fourth Day of August, 2010

David J. Kappos
*Director of the United States Patent and Trademark Office*